United States Patent
Kipersztok et al.

(10) Patent No.: US 9,218,694 B1
(45) Date of Patent: Dec. 22, 2015

(54) RECOMMENDATIONS FOR TIME TO REPLACE PARTS ON MACHINES

(71) Applicant: THE BOEING COMPANY, Chicago, IL (US)

(72) Inventors: Oscar Kipersztok, Redmond, WA (US); Uri Nodelman, Baltimore, MD (US); Michael Swayne, Redmond, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 13/964,277

(22) Filed: Aug. 12, 2013

(51) Int. Cl.
*G07C 5/00* (2006.01)
*G05B 23/00* (2006.01)
*G05B 23/02* (2006.01)
*G06Q 10/00* (2012.01)

(52) U.S. Cl.
CPC ............ *G07C 5/006* (2013.01); *G05B 23/0283* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 6,751,536 B1 | 6/2004 | Kipersztok |
| 7,066,429 B2 | 6/2006 | Mellor |
| 7,149,628 B2 | 12/2006 | Herbstreit |
| 7,206,708 B2 | 4/2007 | Williams |
| 7,209,814 B2 | 4/2007 | Kipersztok |
| 7,230,527 B2 | 6/2007 | Basu |
| 7,275,715 B2 | 10/2007 | McCoskey |
| 7,333,898 B2 | 2/2008 | Griess |
| 7,349,825 B1 | 3/2008 | Williams |
| 7,487,059 B2 | 2/2009 | Davis |
| 7,548,802 B2 | 6/2009 | Avery |
| 7,689,329 B2 | 3/2010 | Avery |
| 7,689,383 B2 | 3/2010 | Black |
| 7,705,725 B2 | 4/2010 | Matsen |
| 7,714,702 B2 | 5/2010 | Khuzadi |
| 7,734,429 B2 | 6/2010 | Pado |
| 7,761,200 B2 | 7/2010 | Avery |
| 7,761,201 B2 | 7/2010 | Avery |
| 7,796,018 B2 | 9/2010 | Khuzadi |
| 7,797,141 B2 | 9/2010 | O'Connell |
| 7,860,618 B2 | 12/2010 | Brandstetter |
| 7,945,427 B2 | 5/2011 | Guenther |
| 7,999,667 B2 | 8/2011 | Carralero |
| 8,036,955 B2 | 10/2011 | Avery |
| 8,106,753 B2 | 1/2012 | Vian |
| 8,112,368 B2 | 2/2012 | Eklund |

(Continued)

*Primary Examiner* — John R Olszewski
*Assistant Examiner* — Gerrad A Foster
(74) *Attorney, Agent, or Firm* — Duft Bornsen & Fettig LLP

(57) ABSTRACT

Systems and methods of recommending replacement of parts on machines. In one embodiment, a method of recommending replacement includes receiving data for a part type, determining a cumulative probability function for an infant mortality of the part type, and determining a cumulative probability function for a natural life of the part type. The method includes defining a lower time boundary and an upper time boundary between which the part type is considered operative. The lower time boundary is defined at a time point at an intersection between the cumulative probability function for the infant mortality and the cumulative probability function for the natural life of the part type. The upper time boundary is defined at a time point representing an estimated end of an operative life of the part type. Recommending replacement of a part on a machine may then be determined based on the upper and lower time boundaries.

20 Claims, 4 Drawing Sheets

(56) References Cited

U.S. PATENT DOCUMENTS

| | | |
|---|---|---|
| 8,116,940 B2 | 2/2012 | Keller |
| 8,155,820 B2 | 4/2012 | Eklund |
| 8,165,826 B2 | 4/2012 | Schimert |
| 8,165,862 B2 | 4/2012 | Schumacher |
| 8,229,785 B2 | 7/2012 | Fung |
| 8,229,791 B2 | 7/2012 | Bradley |
| 8,255,100 B2 | 8/2012 | Schimert |
| 8,296,197 B2 | 10/2012 | Avery |
| 8,335,608 B2 | 12/2012 | Mitchell |
| 8,340,948 B1 | 12/2012 | Song |
| 8,397,580 B2 | 3/2013 | Georgeson |
| 8,406,936 B1 | 3/2013 | Borumand |
| 8,423,430 B2 | 4/2013 | Avery |
| 8,437,904 B2 | 5/2013 | Mansouri |

RECOMMENDATIONS FOR TIME TO REPLACE PARTS ON MACHINES

FIELD

This disclosure relates to the field of maintenance of machines, such as aircraft.

BACKGROUND

Maintenance of aircraft, spacecraft, ships, and other machines can be complicated as the maintenance crew has to diagnose which parts need to be fixed or replaced. In the airline industry for example, a maintenance crew may inspect an aircraft on the flight line periodically or responsive to a particular warning or alarm. If a problem is identified, then the maintenance crew has to decide which parts to replace on the aircraft. Aircraft manufacturers design certain parts as Line-Replaceable Units (LRUs), which are modular parts or components that are designed to be replaced quickly at an operating location. LRUs can be stocked at an airport and installed on an aircraft while the aircraft is on the flight line, instead of having to move the aircraft to a maintenance facility. Although LRUs are designed to be replaced on the flight line, the maintenance crew still has to determine which LRUs to replace on an aircraft.

Presently, a maintenance crew may attempt to troubleshoot the problem within the time the aircraft is parked at the gate as to which LRU(s) to replace on the aircraft. The maintenance crew may alternatively replace multiple implicated LRUs on the aircraft (also referred to as "shot-gunning") because of lack of time or inability to correctly diagnose the problem, even though some of the components may be serviceable for their intended purpose. These methods used for maintenance on aircraft and other machines are inefficient and can increase maintenance costs.

In order to assist the maintenance crew in servicing an aircraft, diagnostics systems have been developed to help diagnose problems on the aircraft. These diagnostic systems analyze symptoms on an aircraft, and provide information to a maintenance crew as to what actions to take in repairing the aircraft.

Because of the importance of maintaining the proper operation of aircraft and other machines, it remains an issue for maintenance crews to diagnose suspect parts, and replace the suspect parts if they are no longer operative.

SUMMARY

Embodiments described herein predict when a part on a machine should be replaced, and provide a recommendation as to whether or not to replace a particular part on the machine, such as an aircraft. The embodiments described herein process historical data about prior replacements of a type of part on one or more machines, and model the lifetime of the part as a infant mortality distribution and a natural life distribution. The embodiments can then predict whether or not this type of part should be replaced on a machine based on the infant mortality distribution and the natural life distribution for the part, and provide the appropriate recommendation. A maintenance crew can then decide whether or not to replace a part on the machine based on the recommendation. This advantageously saves time and cost in maintenance of the machine.

One embodiment comprises a method of recommending replacement of a part installed on a machine. The method includes receiving data for a part type indicating durations of time in which the part type was installed on machines before replacement. The method further includes determining a probability density function over time for an infant mortality of the part type based on the data, and also determining a probability density function over time for a natural life of the part type based on the data. The method further includes determining a cumulative probability function for the infant mortality of the part type by integrating the probability density function for the infant mortality of the part type, and determining a cumulative probability function for the natural life of the part type by integrating the probability density function for the natural life of the part type. Using the cumulative probability function for the infant mortality and the cumulative probability function for the natural life of the part type, the method further includes defining a lower time boundary and an upper time boundary between which the part type is considered operative. The lower time boundary is defined at a time point at an intersection between the cumulative probability function for the infant mortality of the part type and the cumulative probability function for the natural life of the part type. The upper time boundary is defined at a time point representing an estimated end of an operative life of the part type. To recommend replacement of a particular part (of this part type) that is installed on a machine, the method further includes receiving an indication of a length of time that the part has been installed on the machine, and recommending replacement of the part if the length of time that the part is installed on the machine is less than the lower time boundary or greater than the upper time boundary. The method may further include recommending that the part remains installed on the machine if the length of time that the part is installed on the machine is between the lower time boundary and the upper time boundary where the part type is considered operative.

In another embodiment, the method includes providing a user interface that recommends replacement of the part or recommends that the part remains installed on the machine.

In another embodiment, the method further includes receiving additional data regarding replacements of the part type where no defect was found, and adjusting the probability density function for the infant mortality of the part type based on the additional data.

In another embodiment, the infant mortality of the part type represents defective parts and non-defective parts that were replaced before failure.

In another embodiment, the method further comprises defining another upper time boundary, where the other upper time boundary is defined at a time point beyond the estimated end of the operative life of the part type.

In another embodiment, the machine comprises an aircraft, and the part comprises a Line-Replaceable Unit (LRU).

Another embodiment comprises an apparatus for recommending replacement of a part installed on a machine. The apparatus includes a recommendation system configured to receive data for a part type indicating durations of time in which the part type was installed on machines before replacement, to determine a probability density function over time for an infant mortality of the part type based on the data, and to determine a probability density function over time for a natural life of the part type based on the data. The recommendation system is further configured to determine a cumulative probability function for the infant mortality of the part type by integrating the probability density function for the infant mortality of the part type, and to determine a cumulative probability function for the natural life of the part type by integrating the probability density function for the natural life of the part type. The recommendation system is further configured to define a lower time boundary and an upper time boundary between which the part type is considered operative. The lower time boundary is defined at a time point at an intersection between the cumulative probability function for the infant mortality of the part type and the cumulative probability function for the natural life of the part type. The upper time boundary is defined at a time point representing an estimated end of an operative life of the part type. For a part (of this part type) that is installed on the machine, the recommendation system is configured to receive an indication of a length of time that the part is installed on the machine, and to recommend replacement of the part if the length of time that the part is installed on the machine is less than the lower time boundary or greater than the upper time boundary.

Another embodiment comprises a method of recommending replacement of a Line-Replaceable Unit (LRU) installed on an aircraft. The method includes receiving data regarding prior replacements of a type of LRU on a plurality of aircraft, determining a probability density function over time for an infant mortality of the LRU based on the data, and determining a probability density function over time for a natural life of the LRU based on the data. The method further includes determining a cumulative probability function for the infant mortality of the LRU by integrating the probability density function for the infant mortality of the LRU, and determining a cumulative probability function for the natural life of the LRU by integrating the probability density function for the natural life of the LRU. Using the cumulative probability function for the infant mortality and the cumulative probability function for the natural life of the LRU, the method further includes defining a lower time boundary and an upper time boundary between which the LRU is considered operative. The lower time boundary is defined at a time point at an intersection between the cumulative probability function for the infant mortality of the LRU and the cumulative probability function for the natural life of the LRU. The upper time boundary is defined at a time point representing an estimated end of an operative life of the LRU. For a target LRU that is installed on the aircraft, the method further comprises receiving an indication of a length of time that the target LRU is installed on the aircraft, and recommending replacement of the target LRU if the length of time that the target LRU is installed on the aircraft is less than the lower time boundary or greater than the upper time boundary.

The features, functions, and advantages that have been discussed can be achieved independently in various embodiments or may be combined in yet other embodiments further details of which can be seen with reference to the following description and drawings.

DESCRIPTION OF THE DRAWINGS

Some configurations of the present disclosure are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
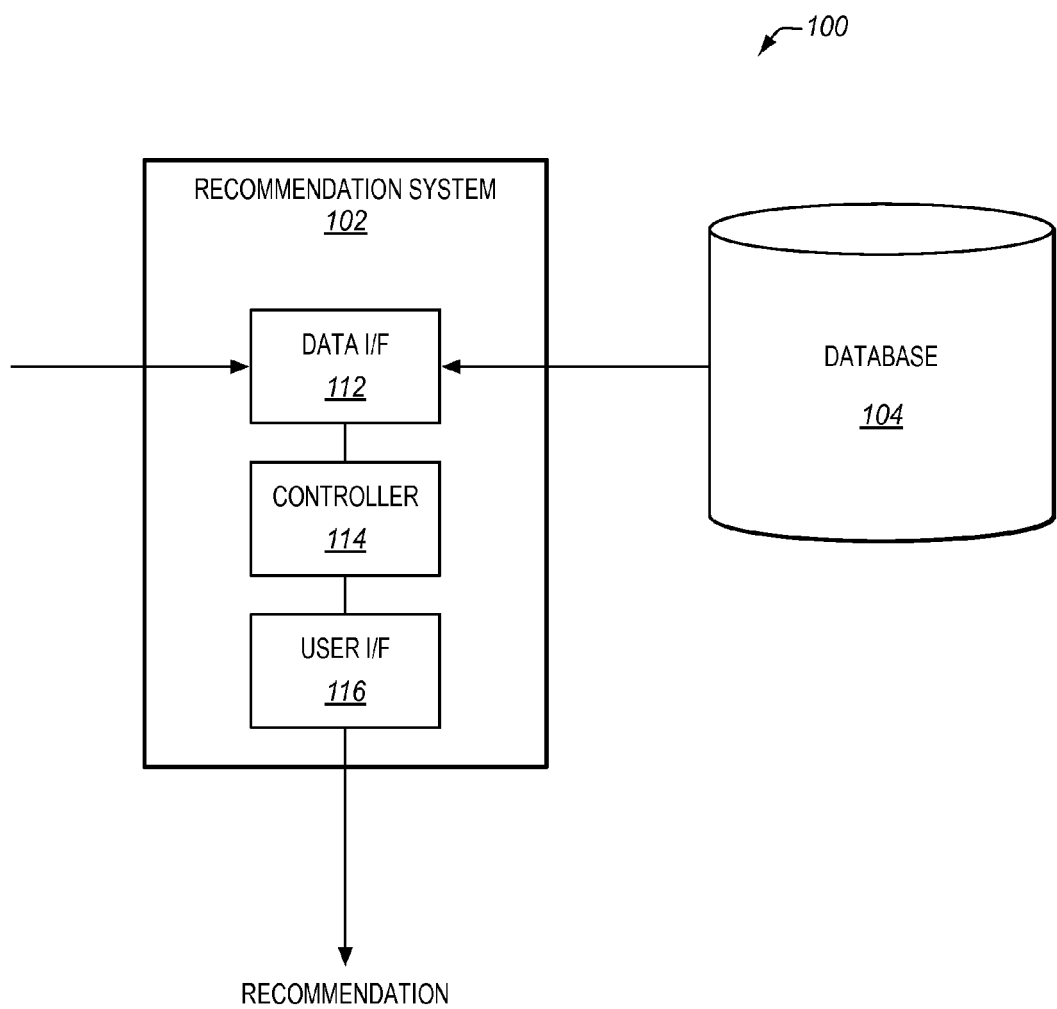
FIG. 1 illustrates a maintenance system in an exemplary embodiment.

FIG. 1 illustrates a maintenance system 100 in an exemplary embodiment. Maintenance system 100 is configured to assist a maintenance crew in repairing one or more machines, such as an aircraft. Maintenance system 100 includes a recommendation system 102 and a database 104. Recommendation system 102 is configured to process historical data for parts installed on machines to provide a suggestion or proposal to the maintenance crew as to whether or not to replace a suspect part on a machine. In this embodiment, recommendation system 102 includes a data interface 112, a controller 114, and a user interface 116. Data interface 112 comprises any component, system, or device configured to communicate with other systems, such as database 104, to receive and/or transmit data regarding parts installed on machines. Controller 114 comprises any component, system, or device configured to process the data to make a recommendation as to whether or not a suspect part should be replaced on a machine. User interface 116 comprises any component, system, or device configured to provide input to a user, such as a member of a maintenance crew, or to receive input from the user. For example, user interface 116 may include a keyboard, a mouse, a monitor/display, etc.

Database 104 is a storage element configured to store historical data for parts that are installed on one or more machines. For example, each time that a part is replaced on a machine, data may be entered into database 104 indicating a part number and a time/date that the part was installed on the machine. This information is stored in records that are indexed by a part number or a part identifier (ID). Thus, database 104 stores historical data indicating how long particular parts have been installed on machines before replacement.

As one particular example of database 104, an airplane manufacturer may maintain a database that is accessible by airlines that purchase aircraft from the manufacturer. Each time a maintenance crew replaces a part on an aircraft, the maintenance crew will provide information about the part replacement (e.g., part number and time period since last replacement) to the database. Thus, the database will contain a large amount of data regarding replacements of parts on many aircraft.

When a maintenance crew is performing maintenance on a machine, such as an aircraft, the maintenance crew may access system 100 to determine whether or not a particular part should be replaced on the machine. For example, assume that the maintenance crew is servicing an aircraft on the flight line. The maintenance crew may identify one or more parts that are suspected of failing, and may need to be replaced. Instead of replacing all of the suspect parts or taking a chance in being unable to troubleshoot the problem within the allotted time to identify which of the suspect parts should be replaced, the maintenance crew can access system 100 to obtain a recommendation as to which part or parts should be replaced on the machine. This is further described in FIG. 2.

Figure 2:
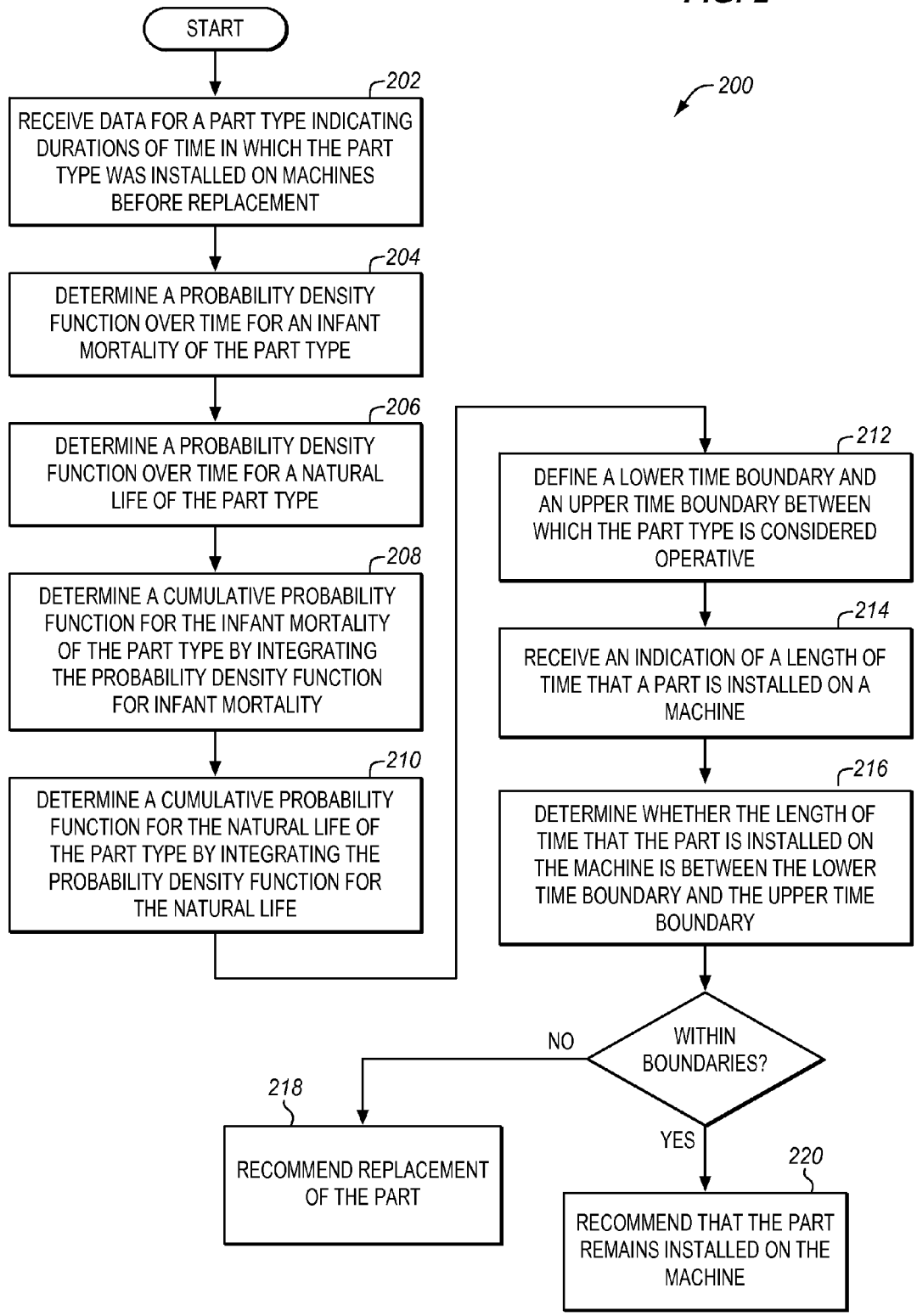
FIG. 2 is a flow chart illustrating a method of recommending replacement of a part installed on a machine in an exemplary embodiment.

FIG. 2 is a flow chart illustrating a method 200 of recommending replacement of a part installed on a machine in an exemplary embodiment. The steps of method 200 will be described with respect to system 100 in FIG. 1, although one skilled in the art will understand that the methods described herein may be performed by other devices or systems not shown. The steps of the methods described herein are not all inclusive and may include other steps not shown.

In step 202, recommendation system 102 (through data interface 112) receives data regarding prior replacements of a type of part, such as from database 104. The (replacement) data received by recommendation system 102 is historical data on the replacement of this same type of part over time. Thus, this data indicates durations of time in which particular parts have been installed on machines before replacement. The term "part" as described herein refers to a component of a manufactured machine. In one embodiment, a part may also be referred as a Line-Replaceable Unit (LRU).

Based on the replacement data of the part type, recommendation system 102 maps the rate of infant mortality failures of the part type. To do so, recommendation system 102 (through controller 114) determines a probability density function over time for the infant mortality of the part type based on the data (see step 204). Infant mortality indicates early replacements of a part type before the end of the useful life of the part type. For example, if a particular part is expected to have a useful life of 9,000 hours but is replaced at 500 hours, then data for this part will be represented in the infant mortality of the part type. Early replacement of parts is typically due to defects in design or manufacturing of the parts. However, early replacement of parts may also be due premature replacement of parts that were not defective. For example, maintenance crews may misdiagnose a problem with a machine, and replace one or more parts prematurely even though the parts are operative for their intended purposes. In these situations, the parts are replaced even though they were not defective. The infant mortality for a part type therefore represents early replacements of defective parts and early replacements for non-defective parts.

Figure 5:
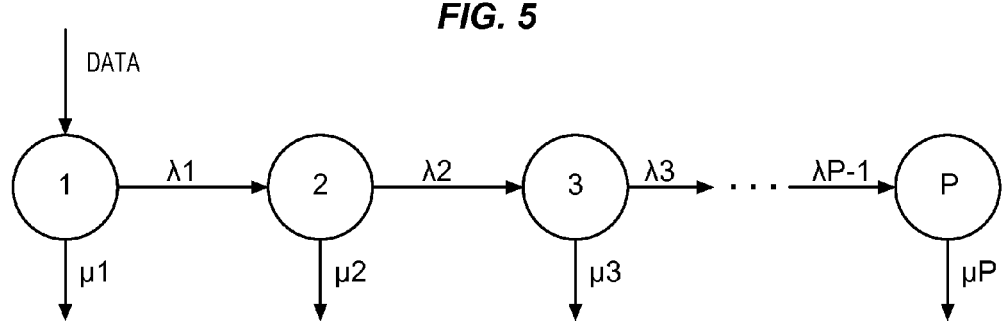
FIG. 5 illustrates a phase-type distribution in an exemplary embodiment.

The infant mortality probability density function may be obtained from a Coxian Phase-Type distribution subject to a Markov process shown in FIG. 5. A phase-type distribution provides a model of the part replacement intervals in successive phases so that parts that are either unnecessarily removed early or parts that are defective (i.e., infant mortality) can be segregated from the parts that will survive their natural life. Depending on the parameterization of the model, the parts that enter this process and exit, prematurely, in early phases (e.g., Phases 1 and 2) can be described by one distribution density function that is referred to as "infant mortality". Although a phase-type distribution is shown in FIG. 5, other types of statistical analysis may be used on the replacement data to map infant mortality.

Figure 3:
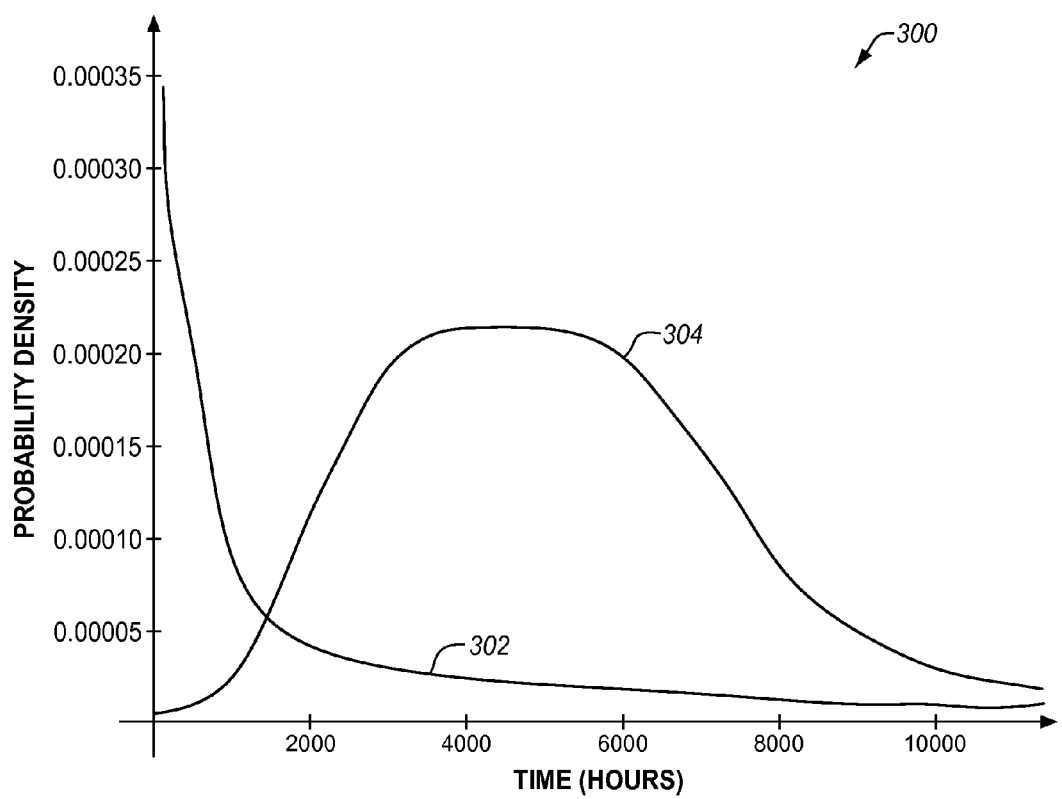
FIG. 3 is a graph illustrating a probability density function for an infant mortality and a probability density function for a natural life of a part type in an exemplary embodiment.

FIG. 3 is a graph 300 illustrating a probability density function of the infant mortality of the part type in an exemplary embodiment. Line 302 in graph 300 represents the probability density function for the infant mortality of the part type over time. The probability density for infant mortality indicates the number or percentage of parts that are replaced due to defects and due to premature replacement of non-defective parts. For example, if 100,000 parts were replaced on machines, then the probability density indicates how many of these parts were replaced at different durations of installation. The failure rate of a part is high early in its life (e.g., between 0 and 1000 hours). However, the failure rate decreases rapidly as defective parts are identified and replaced.

In addition to mapping the infant mortality rate of the part type, recommendation system 102 also maps the natural life or service life of the part type. To do so, recommendation system 102 determines a probability density function over time for the natural life of the part type based on the data (see step 206 in FIG. 2). The natural life (or service life) for the part indicates a time that the part is "serviceable" or "operative" for its intended purpose. In FIG. 3, line 304 in graph 300 represents the probability density function for the natural life of the part type over time. A small number of parts will fail early in their life (due to defects), which is indicated by the left-most portion of the bell curve (between about 0-1000 hours). If a part does not fail within its infancy due to a defect, then the part will generally be serviceable until a random failure is encountered or the part fails due to age and/or wear. Therefore, a majority of part replacements occur between about 3,000 and 6,000 hours of installation according to FIG. 3. A small of parts will not wear as quickly and may be installed longer than an expected life of the parts, which is indicated by the right-most portion of the bell curve (over about 9,000 hours).

The natural life probability density function may also be obtained from a phase-type distribution as shown in FIG. 5. The parts that survive the early phases (e.g., Phases 1 and 2) and continue to propagate through subsequent phases of the process can be represented by another distribution function is referred to as "natural life". Depending on how the problem is parameterized, the infant mortality distribution and the natural life distribution fall out naturally from fitting this model to the data.

Figure 4:
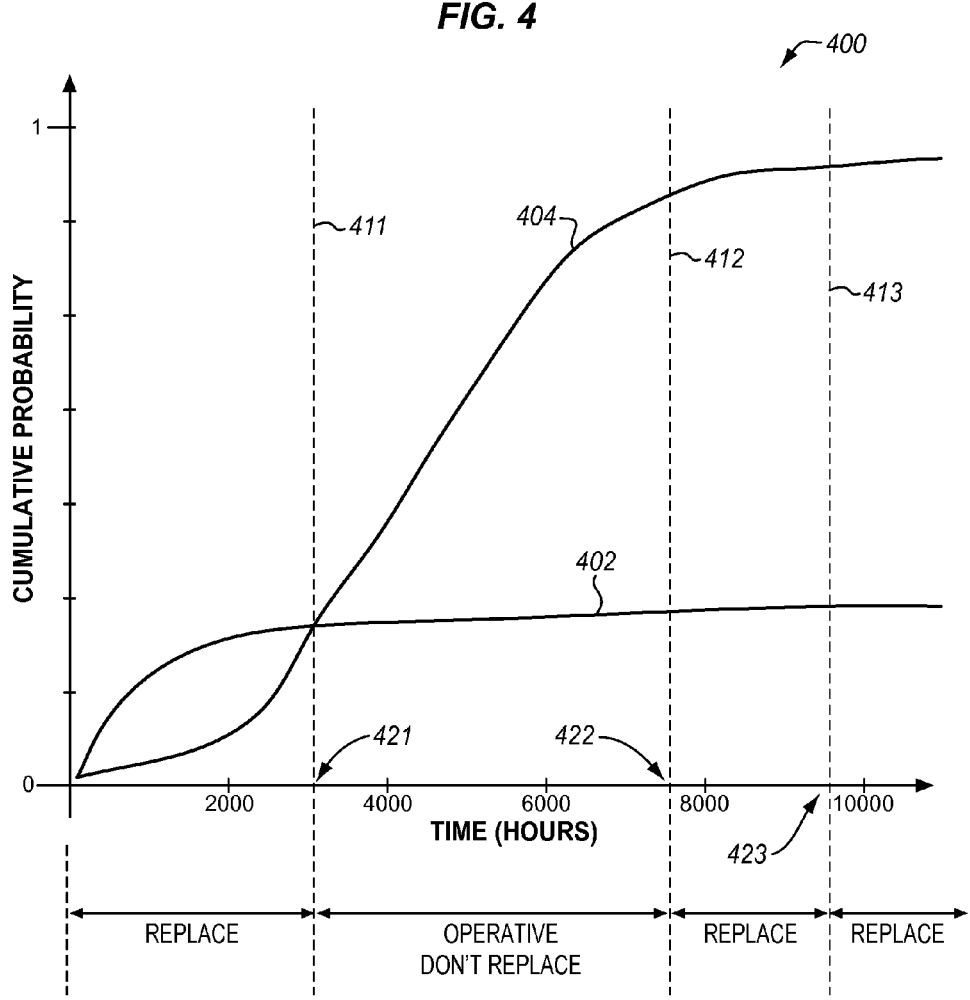
FIG. 4 is a graph illustrating a cumulative probability function for an infant mortality and a cumulative probability function for a natural life of a part type in an exemplary embodiment.

After determining a probability density function for infant mortality and natural life a particular part type, recommendation system 102 converts the probability density functions to cumulative probability functions. In step 208, recommendation system 102 determines a cumulative probability function for the infant mortality of the part type by integrating the probability density function for the infant mortality of the part type (see FIG. 2). In step 210, recommendation system 102 also determines a cumulative probability function for the natural life of the part type by integrating the probability density function for the natural life of the part type. FIG. 4 is a graph 400 illustrating a cumulative probability function for infant mortality and natural life of the part type in an exemplary embodiment. Line 402 in graph 400 represents the cumulative probability function for infant mortality of the part type over time. The cumulative probability function for infant mortality indicates the probability of the failure of a part due to a defect. Line 402 indicates that the probability of failure due to a defect sharply increases early in the life of a part (e.g., between 0 to 1,000 hours). The longer that a part is installed on a machine, the probability of a failure due to a defect levels off. Line 404 in graph 400 represents the cumulative probability function for the natural life of the part type over time. The cumulative probability function for the natural life indicates the probability that a part is not defective and is operative for its intended purpose. Line 404 indicates that the probability a part being operative for its intended purpose is lower in early in installation, but sharply increases after about 2,000 hours of installation time.

After determining the cumulative probability functions for both infant mortality and natural life, recommendation system 102 may determine a time interval where the part type is considered operative, and one or more time intervals where the part type is not considered operative. To do so, recommendation system 102 defines a lower time boundary and an upper time boundary between which the part type is considered operative (in step 212 of FIG. 2). In FIG. 4, for example, the lower time boundary 411 is defined at a time point 421 at an intersection between the cumulative probability function for infant mortality and the cumulative probability function for the natural life of the part type. At this intersection, the probability that a part would fail due to a defect is leveling off (see line 402) according to the cumulative probability function for infant mortality. At the same time point, the probability that the part is operative for its intended purpose is sharply increasing (see line 404) according to the cumulative probability function for natural life. Thus, the intersection represents a transition from a higher likelihood that the part is defective to a higher likelihood that the part is operative.

The upper time boundary 412 is defined at a time point 422 representing an estimated end of an operative life of the part type. After a part has been installed for a time period, such as about 8000 hours in FIG. 4, the probability that the part is operative for its intended purpose begins to level off (see line 404). For example, after the part has been installed on a machine for 7000 hours, 8000 hours, etc., the likelihood of the part being operative for its intended purpose decreases as the part wears out. Recommendation system 102 therefore estimates an end of the operative life of the part. For example, in FIG. 4, recommendation system 102 may estimate the end of the operative life of the part at about 7500 hours. The estimation of the end of the operative life of the part may be based on historical data, may be a mathematical computation based on the cumulative probability function for the natural life, may be a mathematical computation based on the probability density function for the natural life (e.g., a first or second deviation), or may be based on any other information.

After the lower and upper time boundaries 411-412 are defined, recommendation system 102 is able to make a recommendation as to whether or not to replace a particular part on a machine. To do so, recommendation system 102 receives an indication of a length of time that the part is installed on the machine (in step 214 of FIG. 2). For example, the maintenance crew may enter the last replacement date for this part into user interface 116 (see FIG. 1), which indicates how long this particular part has been installed on the machine. In step 216, recommendation system 102 determines whether the length of time that the part is installed on the machine is between the lower time boundary 411 and the upper time boundary 412. If the length of time that the part is installed on the machine is less than the lower time boundary 411 or greater than the upper time boundary 412, then recommendation system 102 recommends replacement of the part in step 218. Below the lower time boundary 411, the likelihood is that the part is defective due to a higher probability of infant mortality and a lower probability of serviceability. Above the upper time boundary 412, the likelihood is that the part is reaching the end of its life and beginning to wear out.

If the length of time that the part is installed on the machine is between the lower time boundary 411 and the upper time boundary 412 where the part type is considered operative, then recommendation system 102 recommends that the part remains installed on the machine in step 220. During this time interval, the likelihood is that the part is not defective and should be serviceable for its natural life due to a decreasing probability of infant mortality and an increasing probability of serviceability.

In order to provide the recommendations of steps 218 and 220, recommendation system 102 may display or otherwise present the recommendations through user interface 116 (see FIG. 1). For example, user interface 116 may include a display that shows the recommendation of whether to replace the part or to leave the part installed on the machine. The maintenance crew can then use the recommendation when servicing the machine.

In addition to defining the lower and upper time boundaries 411-412, recommendation system 102 may define another upper time boundary 413 (see FIG. 4). When a maintenance crew replaces parts, they may inadvertently fail to log the replacement into database 104 (see FIG. 1). Thus, data may artificially indicate that the operative life of this particular part is longer than it actually is. For example, assume that a part was replaced at 7000 hours of operation and again at 14,000 hours of operation, but the maintenance crew failed to enter data for the replacement at the 7000 hour mark. Database 104 will store data for the part indicating that the part was installed for 14,000 hours, which is incorrect. Data such as this indicates an artificially long operative life of a part, and is modeled in the natural life of the part type. To mitigate the effects of this artificial data, recommendation system 102 defines another upper time boundary 413 for the part type. The time point 423 for upper time boundary 413 represents a point beyond the estimated end of the operative life of the part type. For example, recommendation system 102 may estimate that this part type can no longer be operative after 9500 hours of installation because it is either worn out or will soon wear out. This estimation again may be based on historical data, mathematical calculations, or other information. Recommendation system 102 may consider the additional upper time boundary 413 in the recommendation of whether or not to replace a part.

Because recommendation system 102 is able to determine when a part is more likely to fail and to provide a recommendation to a maintenance crew, the maintenance crew is able to more effectively service the machine and replace the parts that are actually in need of replacing. This advantageously saves time in servicing the machine, and also saves costs in avoiding situations where parts are replaced when they are still serviceable.

When parts are removed from machines, these parts may be inspected to determine if the parts failed due to a defect, or failed due to some other reasons, such as a random failure, normal wear, etc. If parts are replaced early in their life but an inspection shows that the parts were not defective, then this data may be logged and used to adjust the mapping of infant mortality. For instance, recommendation system 102 may receive additional data (such as from database 104) regarding replacements of the part type where no defect was found. Recommendation system 102 may then adjust the probability density function for infant mortality of the part type based this data. Therefore, the infant mortality distribution will more accurately represent early replacements of defective parts instead of early replacements of non-defective parts (such as due to a misdiagnosis).

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific configurations were described herein, the scope is not limited to those specific configurations. Rather, the scope is defined by the following claims and any equivalents thereof.

The invention claimed is:

1. A method of recommending replacement of parts, the method comprising:
receiving, at a data interface of a recommendation system, data for a part indicating durations of time in which the part was installed on machines before replacement;
determining, by a controller of the recommendation system, a first probability density function over time for an infant mortality of the part based on the data;
determining, by the controller, a second probability density function over time for a natural life of the part based on the data;
determining, by the controller, a first cumulative probability function for the infant mortality of the part by integrating the first probability density function for the infant mortality of the part over a time period;
determining, by the controller, a second cumulative probability function for the natural life of the part by integrating the second probability density function for the natural life of the part over the time period;
defining, by the controller, a lower time boundary and an upper time boundary between which the part is considered operative, wherein the lower time boundary is defined at a first time point at an intersection between the first cumulative probability function for the infant mortality of the part and the second cumulative probability function for the natural life of the part, and the upper time boundary is defined at a second time point representing an estimated end of an operative life of the part;
for a suspect part that is installed on a machine:
receiving, at a user interface of the recommendation system, an indication of a length of time that the suspect part is installed on the machine; and
recommending replacement of the suspect part if the length of time that the suspect part is installed on the machine is less than the lower time boundary or greater than the upper time boundary by displaying the recommendation at the user interface.

2. The method of claim 1 further comprising:
recommending that the suspect part remains installed on the machine if the length of time that the suspect part is installed on the machine is between the lower time boundary and the upper time boundary by displaying the recommendation at the user interface.

3. The method of claim 2 wherein receiving an indication of a length of time that the suspect part is installed on the machine comprises:
receiving a last replacement date for the suspect part at the user interface.

4. The method of claim 1 further comprising:
receiving additional data regarding replacements of the part where no defect was found; and
adjusting the probability density function for the infant mortality of the part based on the additional data.

5. The method of claim 1 wherein:
the infant mortality for the part represents defective parts and non-defective parts that were replaced before failure.

6. The method of claim 1 further comprising:
defining a second upper time boundary, wherein the second upper time boundary is defined at a third time point beyond the estimated end of the operative life of the part.

7. The method of claim 1 wherein:
the machine comprises an aircraft; and
the part comprises a Line-Replaceable Unit (LRU).

8. An apparatus for recommending replacement of parts, the apparatus comprising:
a recommendation system comprising:
a user interface;
a data interface configured to receive data for a part indicating durations of time in which the part was installed on machines before replacement, wherein the data interface connects to a database that stores historical data for parts installed on the machines;
a controller configured to determine a first probability density function over time for an infant mortality of the part based on the data, to determine a second probability density function over time for a natural life of the part based on the data, to determine a first cumulative probability function for the infant mortality of the part by integrating the first probability density function for the infant mortality of the part over a time period, to determine a second cumulative probability function for the natural life of the part by integrating the second probability density function for the natural life of the part over the time period, and to define a lower time boundary and an upper time boundary between which the part is considered operative, wherein the lower time boundary is defined at a first time point at an intersection between the first cumulative probability function for the infant mortality of the part and the second cumulative probability function for the natural life of the part, and the upper time boundary is defined at a second time point representing an estimated end of an operative life of the part;
for a suspect part that is installed on a machine:
the user interface is configured to receive an indication of a length of time that the suspect part is installed on the machine, and to recommend replacement of the suspect part if the length of time that the suspect part is installed on the machine is less than the lower time boundary or greater than the upper time boundary by displaying the recommendation.

9. The apparatus of claim 8 wherein:
the user interface is configured to recommend that the suspect part remains installed on the machine if the length of time that the suspect part is installed on the machine is between the lower time boundary and the upper time boundary by displaying the recommendation.

10. The apparatus of claim 9 wherein:
the user interface is configured to receive a last replacement date for the suspect part.

11. The apparatus of claim 8 wherein:
the data interface is configured to receive additional data regarding replacements of the part where no defect was found, and to adjust the probability density function for the infant mortality of the part based on the additional data.

12. The apparatus of claim 8 wherein:
the infant mortality for the part represents defective parts and non-defective parts that were replaced before failure.

13. The apparatus of claim 8 wherein:
the controller is configured to define a second upper time boundary, wherein the second upper time boundary is defined at a third time point beyond the estimated end of the operative life of the part.

14. The apparatus of claim 8 wherein:
the machine comprises an aircraft; and
the part comprises a Line-Replaceable Unit (LRU).

15. The apparatus of claim 8 wherein:
the database is maintained by an aircraft manufacturer that is accessible by airlines that purchase aircraft from the manufacturer; and
a maintenance crew provides information about replacement of the part on multiple aircraft to the database.

16. A method of recommending replacement of a Line-Replaceable Unit (LRU) installed on an aircraft, the method comprising:
receiving, at a data interface of a recommendation system, data regarding prior replacements of the LRU on a plurality of aircraft;
determining, at a controller of the recommendation system, a first probability density function over time for an infant mortality of the LRU based on the data;
determining, at the controller, a second probability density function over time for a natural life of the LRU based on the data;
determining, at the controller, a first cumulative probability function for the infant mortality of the LRU by integrating the first probability density function for the infant mortality of the LRU over a time period;
determining, at the controller, a second cumulative probability function for the natural life of the LRU by integrating the second probability density function for the natural life of the LRU over the time period;
defining, at the controller, a lower time boundary and an upper time boundary between which the LRU is considered operative, wherein the lower time boundary is defined at a first time point at an intersection between the first cumulative probability function for the infant mortality of the LRU and the second cumulative probability function for the natural life of the LRU, and the upper time boundary is defined at a second time point representing an estimated end of an operative life of the LRU;
for a target LRU that is installed on the aircraft:
receiving, at a user interface of the recommendation system, an indication of a length of time that the target LRU is installed on the aircraft; and
recommending replacement of the target LRU if the length of time that the target LRU is installed on the aircraft is less than the lower time boundary or greater than the upper time boundary by displaying the recommendation at the user interface.

17. The method of claim 16 further comprising:
recommending that the target LRU remains installed on the aircraft if the length of time that the target LRU is installed on the aircraft is between the lower time boundary and the upper time boundary where the LRU is considered operative by displaying the recommendation at the user interface.

18. The method of claim 17 wherein receiving an indication of a length of time that the target LRU is installed on the aircraft comprises:
receiving a last replacement date for the target LRU at the user interface.

19. The method of claim 16 further comprising:
defining, at the controller, a second upper time boundary, wherein the second upper time boundary is defined at a third time point beyond the estimated end of the operative life of the LRU.

20. A non-transitory computer readable medium embodying programmed instructions which, when executed by a processor, are operable for performing a method of recommending replacement of parts, the method comprising:
receiving data for a part indicating durations of time in which the part was installed on machines before replacement;
determining a first probability density function over time for an infant mortality of the part based on the data;
determining a second probability density function over time for a natural life of the part based on the data;
determining a first cumulative probability function for the infant mortality of the part by integrating the first probability density function for the infant mortality of the part over a time period;
determining a second cumulative probability function for the natural life of the part by integrating the second probability density function for the natural life of the part over the time period;
defining a lower time boundary and an upper time boundary between which the part is considered operative, wherein the lower time boundary is defined at a first time point at an intersection between the first cumulative probability function for the infant mortality of the part and the second cumulative probability function for the natural life of the part, and the upper time boundary is defined at a second time point representing an estimated end of an operative life of the part;
for a suspect part that is installed on the machine:
receiving an indication of a length of time that the suspect part is installed on the machine; and
recommending replacement of the suspect part if the length of time that the suspect part is installed on the machine is less than the lower time boundary or greater than the upper time boundary by displaying a recommendation at a user interface.

* * * * *